United States Patent [19]

Chigasaki et al.

[11] Patent Number: 4,486,245
[45] Date of Patent: Dec. 4, 1984

[54] METHOD OF PRODUCING NICKEL BASE ALLOY STRUCTURE WITH NIAL COATING

[75] Inventors: Mitsuo Chigasaki, Hitachi; Kiyoshi Otaka, Takahagi; Akira Okayama, Hitachi; Kenichi Onisawa, Hitachi; Ko Soeno, Hitachi, all of Japan

[73] Assignee: Hitachi, Ltd., Tokyo, Japan

[21] Appl. No.: 258,558

[22] Filed: Apr. 29, 1981

[30] Foreign Application Priority Data

May 2, 1980 [JP] Japan .................................. 55-57854

[51] Int. Cl.$^3$ ............................................. C22F 1/10
[52] U.S. Cl. .................................... 148/13.1; 148/162
[58] Field of Search .................... 148/13, 13.1, 162, 6, 148/31.5

[56] References Cited

FOREIGN PATENT DOCUMENTS 1274821  5/1972  United Kingdom .

Primary Examiner—R. Dean
Attorney, Agent, or Firm—Antonelli, Terry & Wands

[57] ABSTRACT

A structure comprising a main body formed of a nickel base alloy, and a NiAl coating applied to the main body, wherein the NiAl coating includes a nickel rich NiAl layer and an aluminum rich NiAl layer and the thickness ratio of the nickel rich NiAl layer to the whole NiAl coating is in a range between 20 and 40%. A method of applying an aluminum coating to a nickel base alloy comprising the steps of forming an aluminide layer of $Ni_2Al_3$ on the surface portion of the nickel base alloy by the diffusion and penetration of aluminum, and subjecting the alumide layer to heat treatment to change the aluminide layer to a monoaluminide layer and making the thickness ratio of a nickel rich NiAl layer to the whole monoaluminide layer be in the range between 20 and 40%.

7 Claims, 5 Drawing Figures

METHOD OF PRODUCING NICKEL BASE ALLOY STRUCTURE WITH NIAL COATING

BACKGROUND OF THE INVENTION

This invention relates to a nickel base alloy structure provided with an aluminum coating and methods of producing same, and more particularly it is concerned with a blade and a nozzle of a gas turbine both of which are made of a nickel base alloy and are provided with an NiAl coating on its surface having excellent corrosion and thermal shock resistant properties and a method of producing same.

Nickel base alloys are often used for forming parts of gas turbines, jet engines, etc., that are exposed to heat of high temperature. Particularly, the blade and nozzle of a gas turbine are often exposed to corrosion and oxidation inducing combustion gas atmosphere containing sulfur, chlorine, vanadium, sodium and lead etc. Thus the nickel alloys are required to have not only high mechanical strength at elevated temperatures but also corrosion and oxidation resistant properties against combustion gas. To impart corrosion and oxidation resistant properties to the nickel alloys, it is necessary to increase the contents of chromium, aluminum and other alloying elements in the alloys. However, an increase in the contents of chromium, aluminum and other alloying elements in excess of acceptable levels would cause a reduction in the ductility of the nickel alloys and other defects, with the result that there are naturally limits to the contents of these alloying elements that could be added to the nickel alloys.

Under these circumstances, it has hitherto been common practice to protect the nickel alloys from combustion gas by applying surface treatment to the alloy, such as the provision of a coating layer on their surfaces. Typical treatment for applying coating on the nickel alloys is an aluminum coating applying treatment, in which Al coating is applied by such various means as the immersion of an alloy in a molten salt, sputtering, vaporization deposition, a CVD process and a pack cementation process. In these methods, the pack cementation process is most popular which, as described in Japanese Patent Publication No. 3729/1973 (corresponding to U.S. Ser. No. 796,906 of Feb. 5, 1969), includes the steps of embedding a nickel base alloy in a powder mixture of aluminum powder, inert refractory material powder (alumina, for example) and halogenated active agent powder ($NH_4Cl$, $NH_4F$, $NaCl$, $NaF$, $AlCl_3$, etc.) and maintaining the alloy at a predetermined high temperature to cause the aluminum to be diffused into the nickel alloy to form on its surface a coating high in aluminum content. The coating applied to the surface of a nickel base alloy by the pack cementation method is composed of intermetallic compounds, such as $Ni_2Al_3$, NiAl, etc., formed by the combination of aluminum and the nickel in the nickel base alloy that is treated. When the treatment by the pack cementation method is carried out at low temperature below 850° C. to specifically increase the corrosion resistant property of the alloy by increasing the amount of chromium in the coating layer, the coating layer becomes composed mainly of $Ni_2Al_3$ low in mechanical strength. This makes it necessary to apply heat treatment to the alloy following the pack cementation treatment so as to change the coating to another coating composed mainly of NiAl having increased ductility. After such heat treatment, the coating is composed of a first layer of NiAl rich in aluminum and a second layer of NiAl rich in nickel. The prior art pack cementation method has suffered the disadvantages that, since the heat treatment for changing the composition of the coating has been carried out at high temperature for a prolonged time, the layer of NiAl rich in nickel accounts for the major part of the coating, with the result that the coating provided is not necessarily high in corrosion resistance.

OBJECT OF THE INVENTION

This invention has as its object the provision of a structure of a nickel base alloy provided with a coating of aluminum-nickel intermetallic compound on its surface having both of excellent corrosion and thermal shock resistant properties, and a method of producing same.

BRIEF DESCRIPTION OF THE DRAWINGS

The invention will be further understood from the following detailed description and the accompanying drawings wherein.

DESCRIPTION OF THE PREFERRED EMBODIMENT

In the present invention, a structure such as, for example, a blade of a gas turbine, a nozzle of a gas turbine, and etc. made of a Ni base alloy is subjected to a pack cementation treatment at a predetermined temperature below 850° C. to obtain diffusion and penetration of aluminum elements in the surface layer of the structure, and the structure is then subjected to heat treatment for changing the previously formed aluminide layer of $Ni_2Al_3$ to a monoaluminide layer of NiAl to thereby apply a coating of NiAl having excellent properties to the nickel base alloy. The outstanding characteristic of the invention resides in the points that the heat treatment to be effected following the pack cementation treatment is carried out under the condition that the value of the parameter $P_o$ is in the range between 50 and 52.5, which parameter varies depending on the temperature T (°K.) and time t (hr) of the heat treatment effected after the pack cementation treatment and has the following relation $$P_o = \sum_{i=1}^{n} P_i = \sum_{i=1}^{n} T_i [\log t_i + 20] \times 10^{-3}$$

where $T_i$ and $t_i$ are the temperature and time of such heat treatment respectively of the i-th times, and n is the number of time of the heat treatment effected following the pack cementation treatment, whereby the thickness ratio of the NiAl layer rich in nickel in the coating becomes in the range between 20 and 40%. If the temperature at which the pack cementation is effected exceeds 850° C., much amount of Al diffuses into the Ni base alloy, with the result that there is caused in the alloy a phase which makes the alloy brittle.

Figure 1:
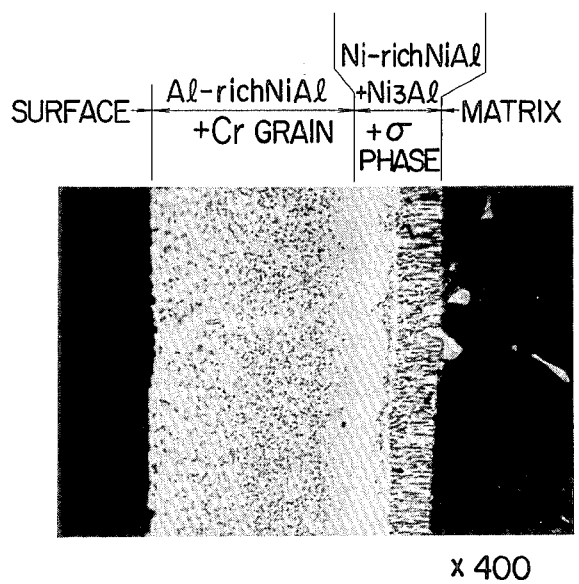
FIG. 1 is a microphotograph of a microstructure of a section of a typical Ni-Al coating layer of the invention.
Figure 2:
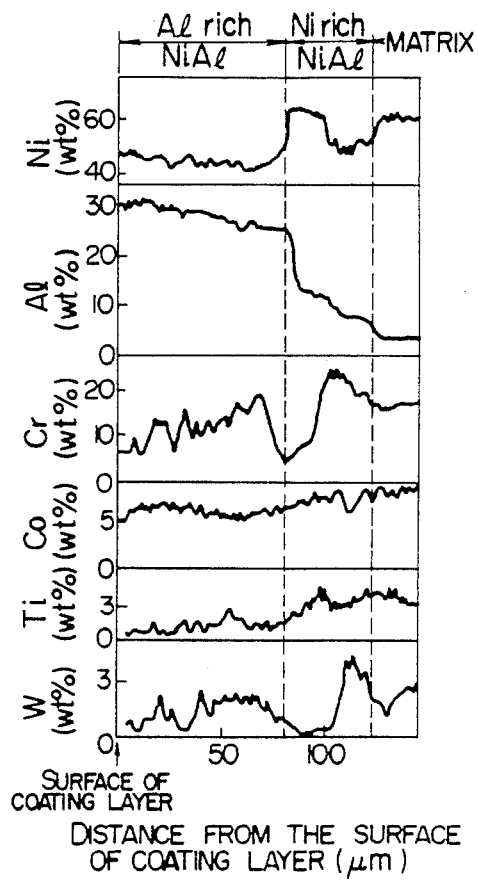
FIG. 2 is a graph showing variations in the weight percentages of the essential components of the Ni-Al coating layer alloys by EPMA.

FIG. 1 shows a microstructure of a section of a typical NiAl coating layer embodying the present invention. FIG. 2 shows variations in weight percent of essential components constituting the NiAl coating layer when the components are analyzed by use of EPMA. In the microstructure of FIG. 1, black points in Al rich NiAl layer shows Cr particles, while $\sigma$ phase in Ni rich NiAl layer is shown by black columnar shapes in contact with a base metal. In the interface between the base metal and the Ni rich NiAl layer there is a Ni$_3$Al layer having several microns in thickness (not shown in FIG. 1). Ni rich NiAl layer is distinguished from Al rich NiAl layer by the ratio of nickel atom number to aluminum atom number in the NiAl layer when analyzed by the EPMA, that is, in the Ni rich NiAl layer the ratio of Ni atom number is larger than the ratio of Al atom number. The interface between the Ni rich NiAl layer and Al rich NiAl layer is shown by a broken line in FIG. 2, at the vicinity of which interface the content of chromium approaches the minimum while the increase of Ni content and decrease of Al content occur in an area from the interface to the base metal.

In the present invention, the ratio of the Ni rich NiAl layer thickness to the whole NiAl layer thickness is made to become within the range of 20 to 40 percents by adopting the condition of the heat treatment following the pack cementation treatment in which the value of the parameter $P_o$ is made to be in the range between 50 and 52.5. By virtue of this feature, the NiAl coating provided by the heat treatment can be given with excellent corrosion and thermal shock resistant properties. When the ratio of the thickness of the NiAl layer rich in nickel in the coating layer exceeds 40%, the corrosion resistance of the structure is greatly reduced. The reasons for this phenomenon seems to reside in the point that the corrosion resistance of the NiAl layer rich in nickel is lower than that of the NiAl layer rich in aluminum located outside the NiAl layer rich in nickel. Conversely when the thickness ratio of the NiAl layer rich in nickel is less than 20%, the thermal impact resistance of the alloy is lessened. The reasons for this phenomenon seems to reside in the points that in the NiAl coating layer there becomes larger the ratio of the Al rich NiAl which is relatively low in ductility and that a Ni$_2$Al$_3$ layer formed by the pack cementation treatment partly remains without changing to the NiAl layer in spite of the succeeding heat treatment. Preferably the ratio of the NiAl layer rich in nickel is in the range between 25 and 35%, more preferably in the range between 28 and 32%. The thickness of the NiAl coating layer is preferably in the range of 50 to 160 microns.

Figure 3:
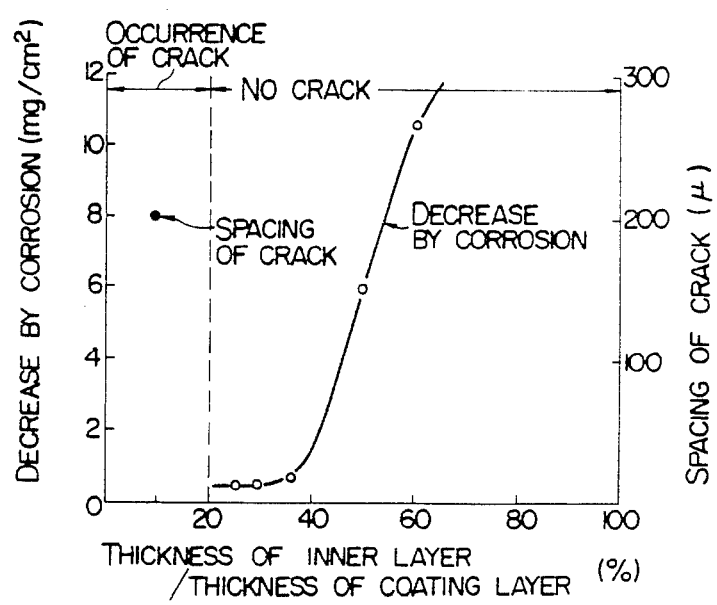
FIG. 3 is a graph showing the relationship between the variations of the thickness of the Ni-Al coating layer and the corrosion and thermal shock properties.

In FIG. 3 there is shown a relation between the variation in the ratio of the Ni rich NiAl coating layer and the corrosion and thermal shock resisting properties, wherein the amount of corrosion increases very much in case the thickness ratio of the Ni rich NiAl layer exceeds 40 percents, while cracks occur in case the thickness ratio thereof is not more than 20 percents.

The blade of a gas turbine is preferably of a casting consisting essentially of, by weight, 0.1 to 0.25% C, 10 to 20% Cr, 5 to 13% Co, 1 to 3% Mo, 1 to 5% W, 0.4 to 1.5% Nb, 2 to 5% Ti, 2 to 5% Al, 0.005 to 0.1% B, 0.05 to 0.3% Zr, 1 to 3% Ta and the balance Ni. The nozzle of a gas turbine is preferably of another casting consisting essentially of, by weight, 0.1 to 0.2% C, 20 to 25% Cr, 16 to 22% Co, 1.5 to 2.5% W, 0.5 to 1.5% Nb, 1 to 2% Ta, 3 to 4.5% Ti, 1 to 3% Al, 0.05 to 0.15% Zr, 0.005 to 0.015% B, and the balance Ni.

One example of the invention will now be described. It is to be understood that the invention is not limited to this specific example.

EXAMPLE 1

Figure 4:
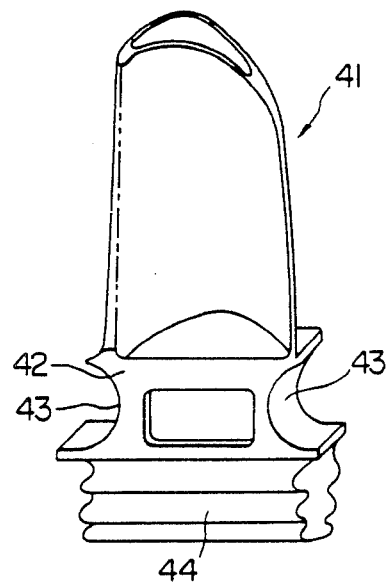
FIG. 4 is a perspective view of a gas turbine blade having a Ni-Al coating layer applied thereto.

A coating layer shown in the present invention was applied to a gas turbine blade 41 shown in FIG. 4 which is made of Ni base alloy of IN-738LC having the following components:

| C  | 0.17 wt % | Nb | 0.9 wt % |
|----|-----------|----|----------|
| Cr | 16.1      | Ti | 3.3      |
| Ni | Balance   | Al | 3.4      |
| Co | 8.6       | B  | 0.01     |
| Mo | 1.8       | Zr | 0.09     |
| W  | 2.5       | Ta | 1.7      |

First, a portion of the gas turbine blade 41 defined between the terminal end thereof and the center 43 of a shank 42 was embedded in a powder mixture for the pack cementation process and then is maintained at 750° C. in 4 hours in an argon gas atmosphere, whereby a Ni$_2$Al$_3$ layer was formed on the surface of such portion of the gas turbine blade 41. The powder mixture consists of Al powder of 25%, NH$_4$Cl powder of 1.5% and Al$_2$O$_3$ powder of 73.5%. Since coating treatment is not necessary regarding another portion of the turbine blade 41 defined between the center 43 of the shank 42 and a dovetail, such another portion was embedded in Al$_2$O$_3$ powder of 100%. After applying Ni$_2$Al$_3$ layer on the gas turbine blade 41 by use of the pack cementation process, there was effected a heat treatment of 2 hours at 1120° C. and then another heat treatment of 24 hours at 843° C. to thereby change the Ni$_2$Al$_3$ layer to NiAl coating layer having a thickness of 120 microns while the thickness ratio of the Ni rich NiAl layer is made to be 30 percents (as shown in a test piece No. 2 in Table 1). After the same pack cementation treatment is applied to other gas turbine blades, heat treatments shown in Table 1 were applied to change Ni$_2$Al$_3$ layer into NiAl layer having various ratios of Ni rich NiAl layer, while the heat treatment parameter $P_o$ was obtained regarding each heat treatment.

Then, the gas turbine blades having the NiAl coating layer were assembled into an actual gas turbine, while gas turbine was operated actually about 10,000 hours by use of light oil including 0.3% sulfur as a fuel so as to test the gas turbine blade as to whether high temperature corrosion and/or crack occurs, wherein the temperature of the surface of the gas turbine blade during the operation is about 800° C. As a result, there was not observed the occurrence of high temperature corrosion nor the occurrence of crack regarding the gas turbine blade test pieces Nos. 1, 2 and 3 shown in Table 1. However, the occurrence of crack was observed regarding the test pieces No. 4, while the high temperature corrosion was observed regarding the test pieces Nos. 5 and 6.

For testing in detail the corrosion and thermal shock resisting properties of the gas turbine blade applied provided on the surface thereof with the NiAl coating layer, other experiments were effected regarding the gas turbine blade Nos. 1 to 5 in Table 1.

As regards the experiment for testing corrosion resistance, the test pieces were immersed in a molten salt of 25% NaCl + 75% Na$_2$SO$_4$ and maintained at 850° C. for 120 hours in an electric furnace, and then subjected to descaling by boiling them in an aqueous solution of 18% NaOH+3% KMnO₄ and then in an aqueous solution of 10% ammonium citrate. Following the treatment, so that corrosion losses were determined to assess the corrosion resistance of the test pieces. Table 1 shows the corrosion losses determined by the test. It will be seen that the corrosion losses of specimens No. 1-3 obtained by the method according to the invention, in which the heat treatment parameter $P_o$ has a value in the range between 50.7 and 52.4 and the thickness ratio of the nickel rich NiAl layer in the NiAl coating to the whole covering layer is in the range between 23 and 38%, were in the range between 0.43 and 0.7 mg/cm². In contrast, corrosion losses of test pieces Nos. 5 and 6 prepared for comparison having the parameter $P_o$ value of 53.2 and 80.3 respectively and the thickness ratios of nickel rich NiAl layer of 50% and 60% respectively to the whole coating layer were 6.0 mg/cm² and 10.7 mg/cm² respectively. It is apparent that the test pieces Nos. 1-3 obtained in accordance with the present invention have excellent corrosion resistance.

The specimens Nos. 1-3 obtained by the method embodying the present invention were further tested regarding thermal impact resistance. For comparison, the test piece No. 4 having the heat treatment parameter $P_o$ of 49.7 and 16% thickness ratio of the nickel rich NiAl layer to the whole NiAl layer was also tested for thermal impact resistance. In the thermal impact resis- -continued

| Cr | 22.5 | Ti | 3.7 |
| Ni | Bal | Al | 1.9 |
| Co | 19.0 | Zr | 0.1 |
| W | 2.0 | B | 0.01 |
| Nb | 1.0 | | |

Then, the gas turbine nozzle was assembled into an actual gas turbine, which gas turbine was operated actually about 10,000 hours by use of light oil including 0.3% sulfur as a fuel so as to test the gas turbine nozzle as to whether or not high temperature corrosion and/or crack occurs. As a result, in a nozzle having a NiAl coating layer formed in accordance with the heat treatment corresponding to that of the test piece 2 shown in Table 1 there was observed no high temperature corrosion nor crack. However, in another nozzle having another NiAl coating layer formed in accordance with the heat treatment corresponding to that of the test piece No. 5 shown in Table 1 there was observed the occurrence of high temperature corrosion.

Thus, in the present invention, it becomes possible to obtain a structure provided on the surface thereof with a NiAl coating layer having both of excellent corrosion resistance and excellent thermal resistivity, which structure is made of a Ni base alloy. Also, in the present invention it becomes possible to obtain a method of producing such temperature superior in quality above described.

TABLE 1

| Number of Test Piece | Condition of Pack Cementation Treatment | Condition of Heat Treatment after Pack Cementation Treatment | Heat Treatment Parameter Po | Thickness of NiAl coating Layer | Thickness Ratio of Nirich NiAl to The Whole Coating Layer | Amount of Decrease By Corrosion | Thermal Shock Resistivity |
| --- | --- | --- | --- | --- | --- | --- | --- |
| 1 | 750° C. 4 hrs | 1050° C., 2 hrs → 843° C., 24 hrs | 50.7 | About 120 microns | 23% | 0.43 mg/cm² | no crack |
| 2 | 750° C. 4 hrs | 1120° C., 2 hrs → 843° C., 24 hrs | 52.1 | About 120 microns | 30 | 0.5 | no crack |
| 3 | 760° C. 3 hrs | 1120° C., 3 hrs → 843° C., 24 hrs | 52.4 | About 120 microns | 38 | 0.7 | no crack |
| 4 | 750° C. 5 hrs | 1000° C., 2 hrs → 843° C., 24 hrs | 49.7 | About 120 microns | 16 | — | Occurrence of Crack with Mean Spacing of about 200μ |
| 5 | 750° C. 2 hrs | 1150° C., 4 hrs → 843° C., 24 hrs | 53.2 | About 120 microns | 50 | 6.0 | — |
| 6 | 750° C. 2 hrs | 1080° C., 6 hrs → 1120° C., 2 hrs → 843° C., 24 hrs | 80.3 | About 120 microns | 60 | 10.7 | — | tance test, the test pieces were subjected to the repetition of heating and water cooling by three times between room temperature and 800° C., one cycle of which repetition lasts for six minutes. After the test, cracks formed on the aluminum coating were observed with an optical microscope. The results show that no crack formation was observed on the surfaces of the test pieces Nos. 1-3 whole formation of cracks of a mean spacing of 200 microns was observed on the surface of the test piece No. 4.

EXAMPLE 2

Figure 5:
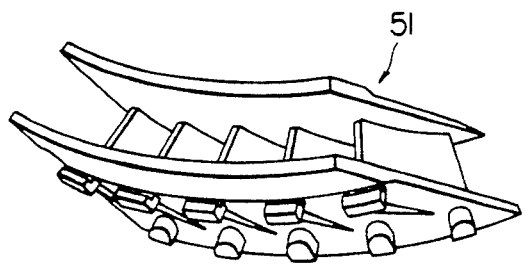
FIG. 5 is a perspective view of a gas turbine nozzle having a Ni-Al coating layer applied thereto.

A NiAl coating layer formed in accordance with the heat treatment conditions shown in the test pieces Nos. 2 and 5 in Table 1 is applied on the whole surface of a gas turbine nozzle 51 shown in FIG. 5, which gas turbine nozzle is made of a Ni base alloy having the following components:

| C | 0.15 wt % | Ta | 1.4 wt % |

What is claimed is:

1. A method of producing a structure having a main body made of a Ni base alloy and a surface layer of NiAl coating comprising the steps of:
   forming an aluminide layer of Ni₂Al₃ on the surface of said main body by the diffusion and penetration of aluminum; and
   subjecting the aluminide layer to heat treatment to change the aluminide layer to a monoaluminide layer of NiAl comprising an outer aluminum rich NiAl layer and an inner nickel rich NiAl layer, while causing the thickness ratio of the nickel rich NiAl layer to the whole monoaluminide layer to be in the range between 20 and 40%.

2. A method of producing a structure having a main body made of a Ni base alloy and a surface layer of NiAl coating comprising the steps of:
   forming an aluminide layer of Ni₂Al₃ on the surface of said main body by the diffusion and penetration of aluminum at a temperature below 850° C.; and subjecting the aluminide layer to heat treatment to change the aluminide layer to a monoaluminide layer of NiAl comprising an outer aluminum rich NiAl layer and an inner nickel rich NiAl layer, while causing the thickness ratio of the nickel rich NiAl layer to the whole monoaluminide layer to be in the range between 20 and 40% by setting the conditions of the heat treatment in such a manner that the value of $P_o$ is in the range between 50 and 52.5, which $P_o$ has the following relation $$P_o = \sum_{i=1}^{n} T_i [\log t_i + 20] \times 10^{-3}$$

where T (°K.) is the temperature of the heat treatment, t (hr) is the time of the heat treatment, and n is the number of times of the heat treatment.

3. A method as claimed in claim 1 or 2, wherein the heat treatment for changing the aluminide layer to the monoaluminide layer is carried out by first holding the main body with the aluminide layer at a solution heat treatment temperature and then holding same at an aging treatment temperature.

4. A method as claimed in claim 1 or 2, wherein the heat treatment for changing the aluminide layer to the monoaluminide layer is carried out by first holding the nickel alloy at a temperature range of 1050°–1140° C. for one to three hours and then at a temperature range of 800°–880° C. for 20 to 30 hours.

5. A method as claimed in claim 1 or 2, wherein the diffusion and penetration of aluminum in the surface portion of the structure are achieved by embedding the main body in an aluminum pack material composed of 10–40 wt% of aluminum powder, 0.1–5 wt% of halogenated active material powder and the balance of inert refractory material powder and holding the nickel alloy at a predetermined temperature.

6. A method of producing a gas turbine blade having a blade portion, a shank portion and a dovetail portion which blade is of a casting made of a Ni base alloy and is provided on the surface of a part thereof with a surface layer of NiAl coating, comprising the steps of:
embedding a part of the blade, which part is defined between the center of the shank portion of the blade and the terminal end of the blade portion thereof, into an aluminum pack cementation material composed of 10–40 wt% of aluminum powder, 0.1–5 wt% of halogenated active material powder and the balance of inert refractory material powder, while embedding another part of the blade defined between the center of the shank portion and the end of the dovetail portion into another material composed of inert refractory material powder,
maintaining said embedded blade at a predetermined temperature below 850° to form an aluminide layer of Ni$_2$Al$_3$ on the surface of the part of the blade,
subjecting the aluminide layer to a heat treatment at a temperature of 1050°–1140° C. in 1–3 hours and then to another heat treatment at a temperature of 800°–880° C. in 20–30 hours to change the aluminide layer to a monoaluminide layer of NiAl having a thickness of 50–160 microns and comprising an outer aluminum rich NiAl layer and an inner nickel rich NiAl layer, while causing the thickness ratio of the nickel rich NiAl layer to the whole monoaluminide layer to be in a range between 20 and 40%, by setting the conditions of the heat treatment in such a manner that the value of $P_o$ is in the range between 50 and 52.5, which $P_o$ has the following relation $$P_o = \sum_{i=1}^{n} T_i [\log t_i + 20] \times 10^{-3}$$

where T (°K.) is the temperature of the heat treatment, t (hr) being the time of the heat treatment, and n being the number of times of the heat treatment,
said Ni base alloy consisting essentially of by weight 0.1–0.25% C, 10–20% Cr, 5–13% Co, 1–3% Mo, 1–5% W, 0.4–1.5% Nb, 2–5% Ti, 2–5% Al, 0.005–0.1% B, 0.05–0.3% Zr, 1–3% Ta and the balance Ni and inevitable impurities.

7. A method of producing a gas turbine nozzle which is of a casting made of a Ni base alloy, said nozzle being provided on the surface thereof with a surface layer of NiAl coating, comprising the steps of:
embedding the nozzle into an aluminum pack cementation material composed of 10–40 wt% of aluminum powder, 0.1–5 wt% of halogenated active material powder and the balance of inert refractory material powder,
maintaining said embedded nozzle at a predetermined temperature below 850° to form an aluminide layer of Ni$_2$Al$_3$ on the surface of the nozzle,
subjecting the aluminide layer to a heat treatment at a temperature of 1050°–1140° C. in 1–3 hours and then to another heat treatment at a temperature of 800°–880° C. in 20–30 hours to change the aluminide layer to a monoaluminide layer of NiAl having a thickness of 50–160 microns and comprising an outer aluminum rich NiAl layer and an inner nickel rich NiAl layer, while causing the thickness ratio of the nickel rich NiAl layer to the whole monoaluminide layer to be in a range between 20 and 40%, by setting the conditions of the heat treatment in such a manner that the value of $P_o$ is in the range between 50 and 52.5, which $P_o$ has the following relation $$P_o = \sum_{i=1}^{n} T_i [\log t_i + 20] \times 10^{-3}$$

where T (°K.) is the temperature of the heat treatment, t (hr) being the time of the heat treatment, and n being the number of times of the heat treatment,
said Ni base alloy consisting essentially of by weight 0.1–0.2% C, 20–25% Cr, 16–22% Co, 1.5–2.5% W, 0.5–1.5% Nb, 1–2% Ta, 3–4.5% Ti, 1–3% Al, 0.05–0.15% Zr, 0.005–0.015 B and the balance Ni.

* * * * *